United States Patent
Camble et al.

(10) Patent No.: US 7,363,425 B2
(45) Date of Patent: Apr. 22, 2008

(54) SYSTEM AND METHOD FOR SECURING DRIVE ACCESS TO MEDIA BASED ON MEDIUM IDENTIFICATION NUMBERS

(75) Inventors: Peter Thomas Camble, Bristol (GB); Stephen Gold, Bristol (GB); Ian Peter Crighton, Bristol (GB); Curtis C. Ballard, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1141 days.

(21) Appl. No.: 10/034,518

(22) Filed: Dec. 28, 2001

(65) Prior Publication Data

US 2003/0126362 A1    Jul. 3, 2003

(51) Int. Cl.
  *G06F 12/00* (2006.01)
  *G06F 13/00* (2006.01)
(52) U.S. Cl. .................. 711/114; 711/156; 711/163
(58) Field of Classification Search .............. 711/100, 711/111, 112, 113, 114, 154, 156, 163; 709/213
  See application file for complete search history.

(56) References Cited

U.S. PATENT DOCUMENTS

| | | | |
|---|---|---|---|
| 5,070,404 A | | 12/1991 | Bullock et al. |
| 5,164,909 A | | 11/1992 | Leonhardt et al. |
| 5,286,954 A | * | 2/1994 | Sato et al. ................ 235/379 |
| 5,303,214 A | | 4/1994 | Kulakowski et al. |
| 5,367,669 A | | 11/1994 | Holland et al. |
| 5,396,558 A | * | 3/1995 | Ishiguro et al. ............ 705/67 |
| 5,416,914 A | | 5/1995 | Korngiebel et al. |
| 5,425,102 A | * | 6/1995 | Moy ........................ 713/183 |
| 5,442,771 A | | 8/1995 | Filepp et al. |
| 5,455,409 A | * | 10/1995 | Smith et al. ............... 235/385 |
| 5,613,154 A | * | 3/1997 | Burke et al. ................. 710/1 |
| 5,615,345 A | | 3/1997 | Wanger |
| 5,734,859 A | | 3/1998 | Yorimitsu et al. |
| 5,802,278 A | | 9/1998 | Isfeld et al. |
| 5,805,864 A | | 9/1998 | Carlson et al. |
| 5,819,309 A | | 10/1998 | Gray |
| 5,835,015 A | * | 11/1998 | Ikeda ....................... 340/568.1 |
| 5,835,940 A | | 11/1998 | Yorimitsu et al. |
| 5,867,335 A | | 2/1999 | Ozue et al. |
| 5,867,736 A | | 2/1999 | Jantz |
| 5,883,864 A | * | 3/1999 | Saliba ......................... 360/92 |
| 5,890,014 A | | 3/1999 | Long |
| 5,920,317 A | * | 7/1999 | McDonald ................ 715/853 |

(Continued)

FOREIGN PATENT DOCUMENTS

EP    0 859 308    8/1998

(Continued)

OTHER PUBLICATIONS

European Search Report issued for EP 02 25 8806, dated Jan. 4, 2005.

(Continued)

*Primary Examiner*—Tuan V. Thai

(57) ABSTRACT

A method for securing access to a data medium comprises recording a unique identification number assigned to each medium in at least a portion of a data library, and commanding at least one selected data transfer element in said library to only accept media having particular ones of said identification numbers.

28 Claims, 3 Drawing Sheets

U.S. PATENT DOCUMENTS

| | | | |
|---|---|---|---|
| 5,943,688 A | | 8/1999 | Fisher et al. |
| 5,970,030 A | | 10/1999 | Dimitri et al. |
| 6,018,720 A | * | 1/2000 | Fujimoto ............... 705/26 |
| 6,038,490 A | | 3/2000 | Dimitri et al. |
| 6,044,442 A | | 3/2000 | Jesionowski |
| 6,052,341 A | * | 4/2000 | Bingham et al. ........... 711/112 |
| 6,084,736 A | | 7/2000 | Kurokawa et al. |
| 6,085,123 A | | 7/2000 | Baca et al. |
| 6,247,096 B1 | * | 6/2001 | Fisher et al. ............ 711/114 |
| 6,295,578 B1 | | 9/2001 | Dimitroff et al. |
| 6,328,766 B1 | | 12/2001 | Long |
| 6,335,927 B1 | | 1/2002 | Elliott et al. |
| 6,336,163 B1 | * | 1/2002 | Brewer et al. .............. 711/112 |
| 6,336,172 B1 | | 1/2002 | Day, III et al. |
| 6,421,196 B1 | | 7/2002 | Takayama et al. |
| 6,421,711 B1 | * | 7/2002 | Blumenau et al. .......... 709/213 |
| 6,425,059 B1 | | 7/2002 | Basham et al. |
| 6,446,141 B1 | | 9/2002 | Nolan et al. |
| 6,502,162 B2 | * | 12/2002 | Blumenau et al. ............. 711/5 |
| 6,507,896 B2 | | 1/2003 | Sanada et al. |
| 6,519,678 B1 | | 2/2003 | Basham et al. |
| 6,532,197 B1 | * | 3/2003 | Cheung ............... 369/30.32 |
| 6,535,964 B2 | | 3/2003 | Sanada et al. |
| 6,574,667 B1 | * | 6/2003 | Blumenau et al. .......... 709/229 |
| 6,606,664 B2 | | 8/2003 | Darago et al. |
| 6,618,796 B2 | | 9/2003 | Yamakawa et al. |
| 6,636,958 B2 | | 10/2003 | Abboud et al. |
| 6,681,303 B1 | | 1/2004 | Watanabe et al. |
| 6,725,394 B1 | * | 4/2004 | Bolt ............................. 714/7 |
| 6,731,625 B1 | | 5/2004 | Eastep et al. |
| 6,742,034 B1 | | 5/2004 | Schubert et al. |
| 6,799,255 B1 | * | 9/2004 | Blumenau et al. .......... 711/152 |
| 6,813,698 B2 | | 11/2004 | Gallo et al. |
| 6,823,398 B1 | | 11/2004 | Lee et al. |
| 6,832,287 B2 | | 12/2004 | Beeston et al. |
| 6,842,784 B1 | | 1/2005 | Black |
| 6,850,380 B2 | * | 2/2005 | Basham et al. ............... 360/69 |
| 6,856,966 B1 | * | 2/2005 | Fujimoto ............... 705/21 |
| 2001/0044877 A1 | * | 11/2001 | Kanazawa et al. .......... 711/111 |
| 2002/0194294 A1 | * | 12/2002 | Blumenau et al. .......... 709/213 |

FOREIGN PATENT DOCUMENTS

| | | |
|---|---|---|
| EP | 0859308 | 8/1998 |
| EP | 0 881 560 | 12/1998 |
| EP | 0 978 841 | 2/2000 |
| EP | 1 039 410 | 9/2000 |
| EP | 1 158 386 | 11/2001 |
| EP | 1156408 | 11/2001 |
| JP | 09185465 | 7/1997 |
| JP | 10269026 | 10/1998 |
| JP | 2001014257 | 1/2001 |
| JP | 2002304791 | 10/2002 |

OTHER PUBLICATIONS

Foreign Search Report dated Feb. 13, 2003.
IBM Technical Disclosure Bulletin, "Optical Disk Drive Loader for Work Station with Pluggable Magazine", vol. 38, No. 12, Dec. 1955, pp. 243-246.
IBM Technical Disclosure Bulletin, "Logical Grouping of Data Storage Media in a Library System", vol. 35, No. 5, Oct. 1992—pp. 17-20.
Massiglia, P., "The Raid Book", 6th edition, Feb. 1997, 83 pages.
"Sharing Backup Resources,"Ralph Cuellar; Apr. 2000.
"The Gator Tape Library Family Architecture," John Kranz; Oct. 1999.
"Fibre Channel Fundamentals," Tom Weimer.
"Spectra 12000 User Guide," Sep. 2000.
European Search Report issued for EP 02 25 8778 dated Sep. 23, 2005.
European Search Report issued for EP 02 25 8774 dated Sep. 23, 2005.
European Search Report issued for EP 02 25 8807 dated Sep. 28, 2005.
Anonymous: "Veritas Volume Manager Administrator's Guide" Internet Article, 'Online! Aug. 2001; XP 002340475; pp. 53-90; pp. 223-240.

* cited by examiner

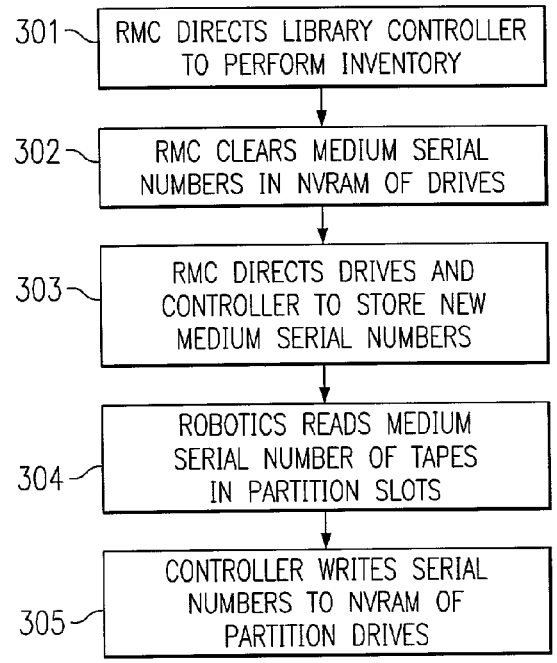
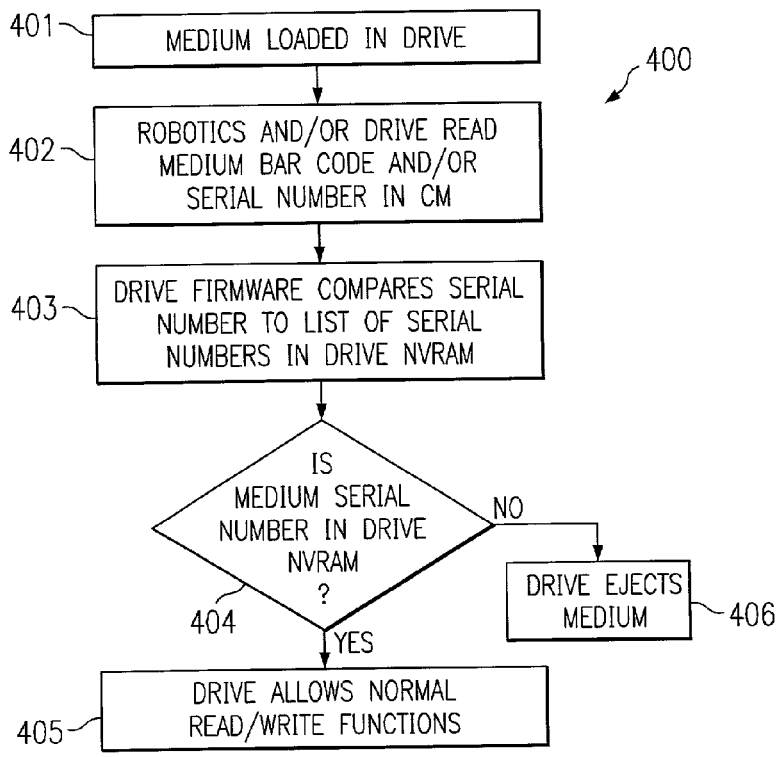

SYSTEM AND METHOD FOR SECURING DRIVE ACCESS TO MEDIA BASED ON MEDIUM IDENTIFICATION NUMBERS

RELATED APPLICATIONS

The present invention is related to the following copending and commonly assigned United States patent applications: System and Method for Partitioning a Storage Area Network Associated Data Library, filed Dec. 28, 2001 and issued as U.S. Pat. No. 6,715,031; System and Method for Partitioning A Storage Area Network Associated Data Library Employing Element Addresses, filed Dec. 28, 2001 and issued as U.S. Pat. No. 6,839,824; Ser. No. 10/032,662, entitled System and Method for Managing Access to Multiple Devices in a Partitioned Data Library, filed Dec. 28, 2001; Ser. No. 10/032,923, entitled System and Method for Peripheral Device Virtual Functionality Overlay, filed Dec. 28, 2001; Ser. No. 10/034,888, entitled System and Method for Securing Drive Access to Data Storage Media Based On Medium Identifiers, filed Dec. 28, 2001; Ser. No. 10/033,010, entitled System and Method for Securing Fiber Channel Drive Access in a Partitioned Data Library, filed Dec. 28, 2001; Ser. No. 10/033,003, entitled Method for Using Partitioning to Provide Capacity on Demand in Data Libraries, filed Dec. 28, 2001; System and Method for Intermediating Communication with a Moveable Media Library Utilizing a Plurality of Partitions, filed Dec. 28, 2001 and issued as U.S. Pat. No. 6,845,431; and Ser. No. 10/034,083, entitled System and Method for Managing a Moveable Media Library with Library Partitions, filed Dec. 28, 2001; the disclosures of which are hereby incorporated herein by reference.

TECHNICAL FIELD

The present invention is generally related to data storage and specifically to systems and methods for securing drive access to media based on medium identification numbers.

BACKGROUND

One of the most attractive aspects of a storage area network (SAN) is that network connectivity enables a company to efficiently use storage by sharing storage capacity among a number of servers. This may be implemented using a large number of small capacity storage devices. However, unless sufficiently robust management software is employed, such use of small capacity devices in a SAN may result in significant management overhead. Most users prefer to install large capacity storage devices and partition the device(s), assigning each partition to a different server. For example, existing firmware for enterprise level disk arrays allow users to define multiple redundant arrays of independent disks (RAID), where each RAID set appears as a different logical unit number (LUN). Each one of these LUNs may be dedicated to a different server.

In certain SAN usage scenarios, such as may arise for storage service providers (SSPs), there are multiple customers attempting to share common SAN resources. In such cases, there is a need to ensure that a customer can only see and access the storage resources it has been allocated and prevent the customer from accessing storage of other SAN customers. For example, if a customer stores their critical business data with a SSP, then they generally do not want other customers of the SSP reading their data or even being aware that the customer has information stored with the SSP. To isolate user data in a data library the library may be partitioned. Typically, special hardware or special backup software as described below has been used to implement partitioning. However, a problem may arise in a partitioned library if a medium is accidentally placed in a wrong slot by a library operator. This may allow this medium to be read by another customer or by a user of another partition.

Existing software-based data library partitioning solutions typically employ a host system that restricts access to portions of a tape library. The host restrictions are implemented by a mediating (software) process on a host system to enforce partition restrictions. However, this approach is problematic. Specifically, the approach is undesirable if the data library is utilized in a SSP environment. In SSP environments, the data library and the host systems belong to different entities (e.g., the SSP and the customers). Placement of software mediating processes on host systems is unattractive, because it increases the burden on the customers to make use of the storage service. Moreover, many customers are unwilling to allow other parties to place software on their host systems. Additionally, the software mediating process approach is typically incompatible with existing data back-up utilities, i.e., the software mediating process approach requires the use of specialized data back-up applications. Hence, users are effectively denied the ability to run desired backup software.

An additional problem may arise in that a library operator may accidentally place a medium in an incorrect storage slot within a partitioned data library or in an entirely incorrect data library within an SSP's facility. This may allow this misplaced medium to be read by an SSP customer or user other than the owner of the information on the misplaced medium.

The use of memory in a tape cartridge, generally referred to as cartridge memory (CM), is known in the art. Existing cartridges and drives store information in the CM such as how many times a tape has been loaded, a cassette serial number, what was last written on the tape, what block was last written to on the tape and/or the tape error rate. Conventionally this information facilitates setting up the tape when it is inserted back into a drive. For example, each time a tape cartridge with CM is inserted into a drive, the CM is read during initialization of the drive. During the drive initialization sequence, the drive reads the memory, diagnoses the tape, recognizes the tape format and where writing should begin. Additionally, information in the memory about error rate and/or number of loads can help diagnose failing tapes. Such CM may also be referred to as memory in cartridge (MIC).

SUMMARY OF THE INVENTION

A method for securing access to a data medium comprises recording a unique identification number assigned to each medium in at least a portion of a data library, and commanding at least one selected data transfer element in the library to only accept media having particular ones of the identification numbers.

Another embodiment of the present method for securing access to data media in a particular partition of a partitioned data library comprises listing identification numbers of media that data transfer elements in the partition are allowed to access in memory storage of the data transfer elements in the partition, reading an identification number of a selected medium, checking the memory storage of a data transfer element receiving the selected medium for the identification number of the selected medium, and accessing the selected medium in response to the identification number of the selected medium being present in the memory storage of the data transfer element receiving the selected medium.

An embodiment of a partitioned data library employing the present invention comprises data storage media, each medium of the media having an identification number, a plurality of storage element slots each of the slots adapted to store a medium of the data storage media, at least one set of at least one of the slots assigned to one partition of a plurality of library partitions, and a plurality of data transfer elements that are adapted to receive the media and transfer data to and from the media, each of at least one set of at least one of the data transfer elements assigned to one of the library partitions, wherein access to the media by each of the data transfer elements is restricted to media having particular ones of the identification numbers.

BRIEF DESCRIPTION OF THE DRAWING

FIG. 3 is a flow chart of initialization of the present method according to a preferred embodiment; and FIG. 4 is a flow chart of operation of the present method according to a preferred embodiment.

DETAILED DESCRIPTION

The present invention is directed to systems and methods that provide medium-based security within a data library based on an identification number associated with a medium. The present system and method provides a failsafe for secure data library partitioning by limiting access to certain media at the drives themselves.

A SAN attached data library may be logically partitioned into many smaller libraries without the use of special hardware or software. Each of the drives or data transfer elements in the library may be designated for use by a different host system that has free access to the library robotics controller as well as to the designated drives. Such a system and method is disclosed in copending U.S. patent application Ser. No. [30014510-1], "System and Method For Partitioning a Storage Area Network Associated Data Library". A set of drives and medium storage slots of the library are assigned to each partition. The movement of media is restricted to and from slots and drives within a partition. The drives in the library are preferably assigned a limited range of media that each drive may access for read/write functions.

In accordance with the present invention, a CM-enabled drive, usually a fiber channel (FC)-connected drive, is preferably configured out-of-band in such a library, via a library automated control interface (ACI). Part of this configuration may include setting the drive up to only accept media that have particular serial numbers or other universally-unique identification numbers assigned to the media. These acceptable serial numbers are preferably stored in non-volatile random access memory (NVRAM) of the drive or another location readily accessible by firmware of the drive. The serial number may be encoded in a barcode disposed on the medium or stored in CM of the medium. Thus, each drive may be configured to disallow access to media that does not belong to the drive's partition and thereby a tape or other medium cannot be read by a drive in the wrong partition. Preferably these serial numbers or unique identification numbers are universally unique. For example a universally unique serial number of a medium with CM is permanently stored in the medium's CM at manufacture. However, a unique identification number, such as may be encoded in a barcode, may only be unique within a physical library, in order to differentiate between partitions. Barcode encoded identification numbers unique within a SSP may be employed to insure a medium is not placed in an improper physical library. Advantageously, this system and method will work with tape cartridges with no cartridge memory (CM) or other media by using the aforementioned barcodes. The present system and method allows either manual or automatic initialization of a data library to read the serial numbers from specified media.

Figure 1:
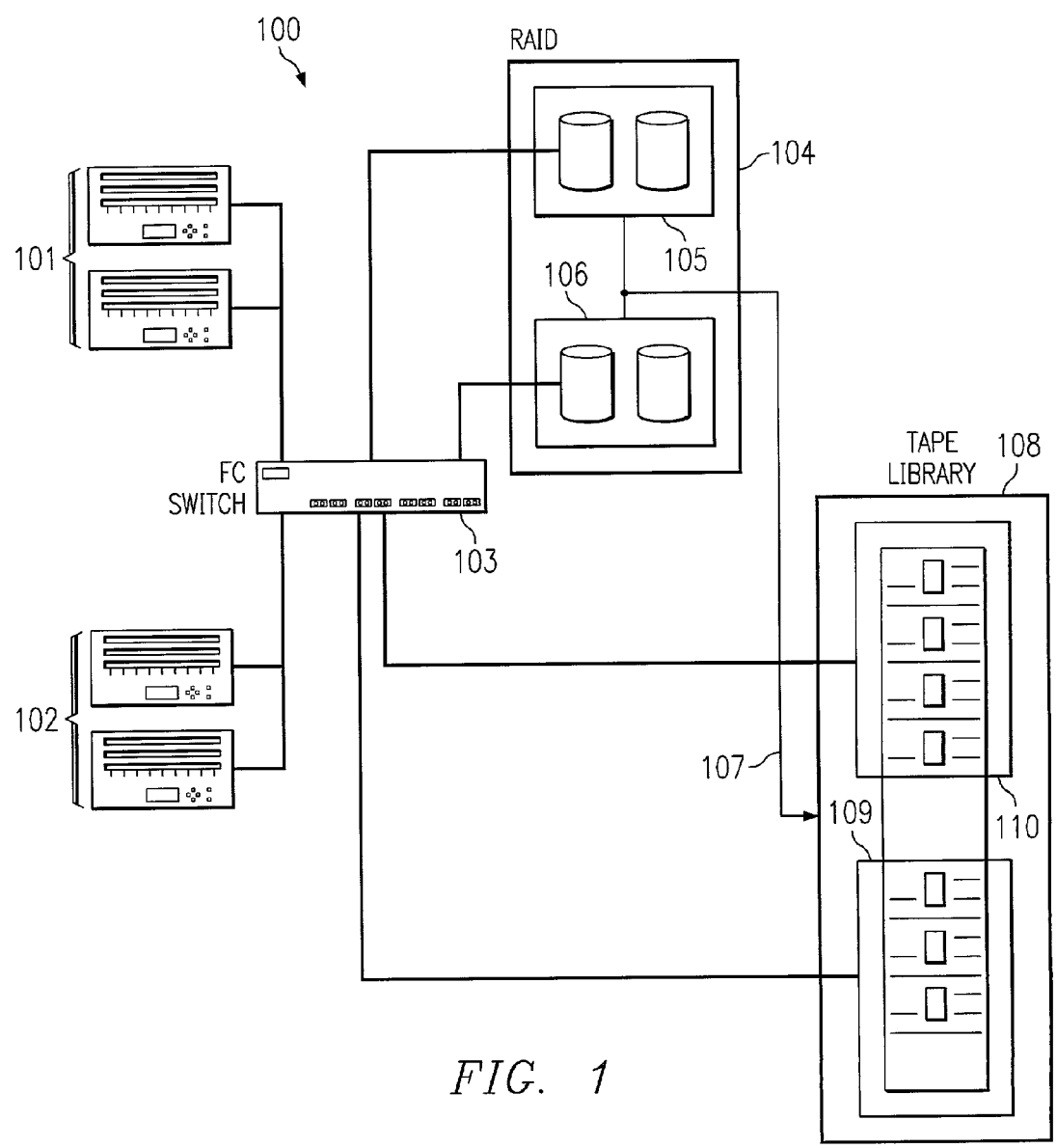
FIG. 1 is a diagrammatic illustration of a SAN operating consistent with the teachings of the present invention.

Turning to FIG. 1, SAN 100 is shown. By way of example, first and second customer servers 101 and 102 are connected to SAN 100 via FC switch 103. RAID 104 may be partitioned, assigning first partition 105 to server 101 and second partition 106 to server 102 using existing LUN-based RAID partitioning methods. Zero downtime backups (ZDBs) may be performed of the data each server has on the RAID to data library 108, via ZDB interconnectivity 107 between RAID 104 and data library 108. Such ZDBs preferably employ data-mover firmware embodied in RAID 104 or other elements of SAN 100. ZDBs are preferably carried out without impinging on the processor operations or LAN capacity of servers 101 and 102. Data library 108 is preferably partitioned in such a manner as to insure that data for server 101 is maintained in partition 109 separate from data for server 102, and that the data of server 102 is maintained in partition 110 separate from data for server 101. Such partitioning facilitates restricting access such that the servers may not access each other's data even though both servers' data is maintained in the same physical library.

Figure 2:
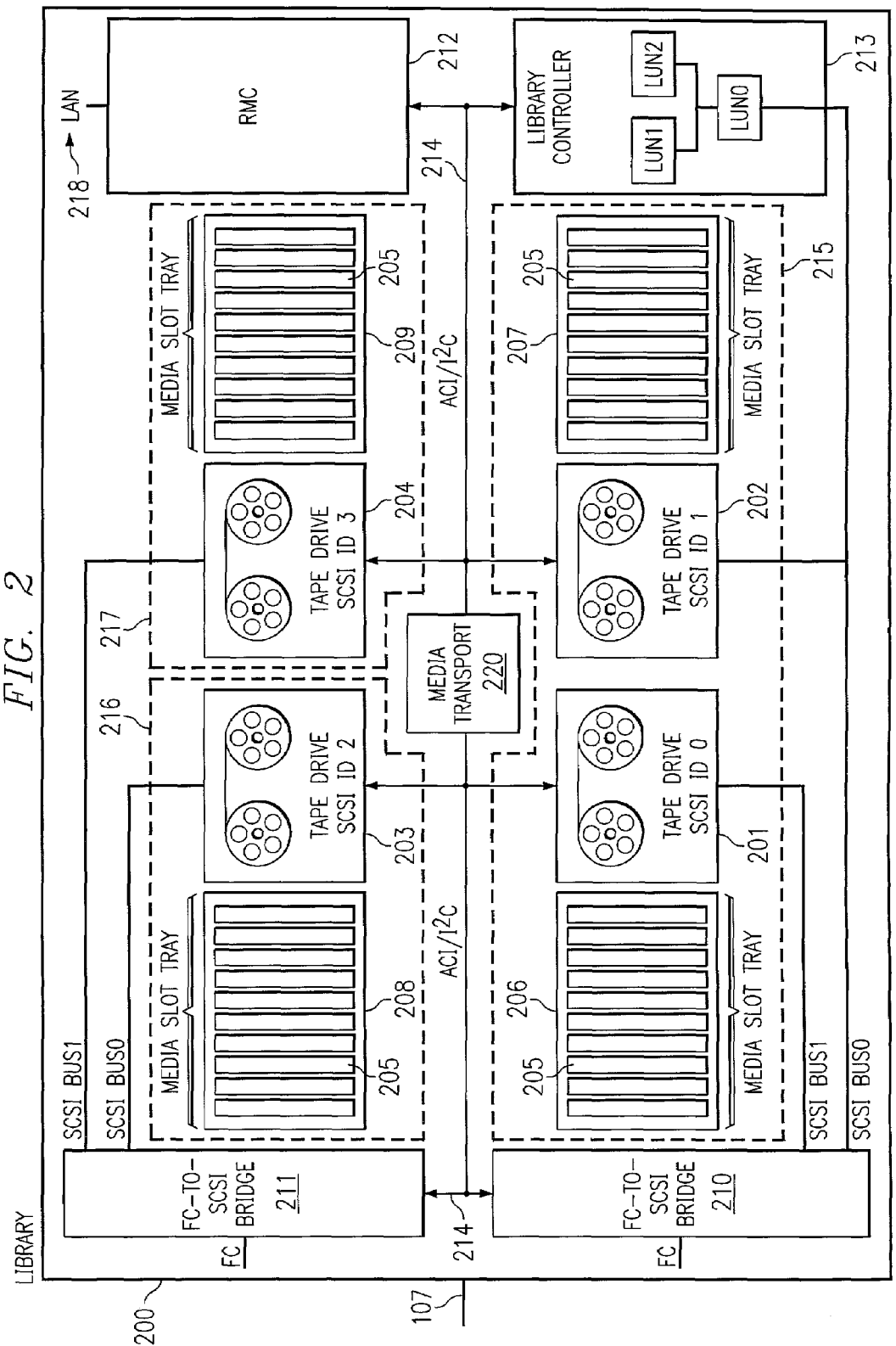
FIG. 2 is a diagrammatic illustration of an example of a data library employing a preferred embodiment of the present invention.

Data tape library 200 employing a preferred embodiment of the present system and method is illustrated in FIG. 2 as an example of a library that may be employed as library 108 of FIG. 1. However, other library designs and/or capacities may embody the present system and method. Exemplar data tape library 200 has four data transfer elements or drives 201-204, forty media storage element slots 205 organized into four trays 206-209 of ten slots 205 each, two FC-to-SCSI bridges 210 and 211, a library management interface card or remote management card (RMC) 212 and library controller 213. Drives 201-204, FC-to-SCSI bridges 210 and 211, RMC 212 and library controller 213 preferably communicate with each other preferably using an inter-integrated circuit ($I^2C$) bus, shown here as automated control interface (ACI) 214, or the like.

For partitions employed by the present system and method, at least one drive should be assigned to each partition. Drives 201-204 are preferably enabled to read CM, thereby allowing a drive to read a serial number residing in CM of a medium disposed in the drive. Additionally drives 201-204 may incorporate barcode readers to read barcodes disposed on a medium received by a drive. Preferably, media slots 205 are also assigned to each partition to house the media assigned to the partition. A virtual library controller should be addressable with respect to each partition to control movement of media between the slots and drives by library robotics 220. Library robotics 220 may employ a barcode and/or a CM reader used for initialization of one embodiment of the present invention and/or for reading the serial numbers of media during transport in an embodiment of the present invention, as detailed below.

The example partitioning shown in FIG. 2 is indicated by boxes 215, 216 and 217. As illustrated, LUN0 corresponds to partition 215, LUN1 corresponds to partition 216, and LUN2 corresponds to partition 217. Finally, import/export elements or mailslots may be assigned to each partition or configured for use by the entire physical library. Preferably, easily-accessible media storage slots may be configured as mailslots by the present invention.

The present method may be used to move responsibility for limiting access to certain media down to the drive and medium level. Turning to FIG. 3, preferred method for initialization of the present invention is illustrated and broadly designated by the number 300. Recordation of serial numbers is preferably coordinated by the RMC. The RMC directs the library controller to perform an off-line initialization sequence, for example an inventory of specified partitions of the library, box 301. The RMC then sends a command at box 302 to drives in a partition, via the library controller and the ACI, clearing the list of allowed serial numbers for each drive in the partition. Then another command is sent to the partition drives at box 303 to store a new list of allowed serial numbers. Preferably, the library robotics employ a barcode reader and/or a CM reader to read a serial number of each medium in the slots assigned to each partition at box 304. Alternatively, a medium may be removed from a slot and inserted into a drive to read the medium's serial number from CM; or to read the medium's serial number from a barcode disposed on the medium, employing a barcode reader incorporated into the drive. As a further alternative, the serial numbers may be manually entered via a web browser interface or the like for the RMC. The library controller preferably writes the serial numbers of media disposed in the slots of a partition to NVRAM of drives in the partition, via the ACI at box 305.

Preferred method of operation 400 of the present invention is illustrated in FIG. 4. In a library initialized as illustrated in FIG. 3 and described above, a medium may be loaded into a drive by the library at box 401, and at box 402 the library robotics and/or the drive itself reads a barcode, disposed on the medium, employing a barcode reader incorporated into the library robotics or the drive, respectively. Alternatively or additionally, at box 402, a cartridge serial number may be read from CM by the drive or by a CM reader incorporated into the library robotics. Drive firmware checks to see whether the serial number of the medium is in the NVRAM of the drive at box 403. If at box 404 the serial number is in the NVRAM, then the drive recognizes that medium as belonging to the same partition as the drive, and preferably enables the connected host system to have unhindered read/write access to the medium at box 405. If, however, the drive does not find the serial number in its NVRAM at 404, then preferably the drive immediately ejects the medium at box 406 and thus denying the accessing host access to the medium.

The present system is preferably tamper-proof, in that the drive firmware enforces access control, and preferably the firmware or NVRAM contents cannot be changed by the end user. So even if the user has unrestricted access to both the drives and library robotics at the command level, the user cannot defeat the access controls. Specifically, the identifier checking mode of a drive preferably may not be altered in band, such as by a SCSI command. Such an alteration is preferably only allowed to be carried out out-of-band, over the ACI. This out-of band alteration preferably may only be made over a LAN connected to the RMC, which in turn communicates over on an I²C to the library controller or via the library front panel. As indicated above, the controller communicates with the drives over an ACI. This isolation of control and security facilitates use of conventional, unmodified backup application software by a user rather than a software dictated by a SSP because the drive firmware can enforce drive access limit access.

The drives may also be configured to not check the identifier resulting in an unsecured setting at the drive level. This is preferably the default setting of the drives in a partitioned data library and allows media to be read in a standalone tape drive such as at a customer's premises.

What is claimed is:

1. A method for securing access to a data medium said method comprising:
    recording a unique identification number assigned to each medium in at least a portion of a data library;
    commanding at least one selected data transfer element in said library to only accept media having particular ones of said identification numbers; and
    ejecting a medium from a data transfer element in response to said identification number not being one of said particular ones of said identification numbers.

2. The method of claim 1 wherein said recording step further comprising:
    clearing a previous list of allowed identification numbers for each data transfer element.

3. The method of claim 1 wherein said recording step further comprises:
    reading said identification numbers of said media.

4. The method of claim 1 wherein said recording step further-comprises:
    listing said identification numbers of media in memory storage of said at least one selected data transfer elements that said at least one selected data transfer elements is to be allowed to access.

5. The method of claim 1 wherein said recording step further comprises:
    entering identification numbers of media said at least one selected data transfer elements is allowed to access in memory storage of said at least one selected data transfer elements.

6. The method of claim 1 further comprising:
    reading said identification number of said medium during transport of said medium from a medium storage element slot to one of said data transfer elements.

7. The method of claim 1 further comprising:
    reading said identification number of said medium using a data transfer element receiving said medium.

8. The method of claim 1 wherein said commanding step further comprises:
    checking memory storage associated with said at least one selected data transfer element for said identification number of said medium.

9. The method of claim 1 wherein said identification number is encoded in a barcode, disposed on said medium.

10. The method of claim 1 wherein said identification number resides in cartridge memory of said medium.

11. The method of claim 1 wherein said data library is partitioned into a plurality of partitions and said recording step comprises reading said identification numbers of said media in a particular partition; and
    said commanding step further comprises restricting access of said at least one selected data transfer elements to said media that is in a same partition as said at least one selected data transfer elements.

12. The method of claim 1 wherein said unique identification numbers are universally unique.

13. A method for securing access to data media in a particular partition of a partitioned data library, said method comprising:

listing identification numbers of media that data transfer elements in said partition are allowed to access in memory storage of said data transfer elements in said partition;

reading an identification number of a selected medium;

checking said memory storage of a data transfer element receiving said selected medium for said identification number of said selected medium; and accessing said selected medium in response to said identification number of said selected medium being present in said memory storage of said data transfer element receiving said selected medium.

14. The method of claim 13 further comprising:

ejecting said selected medium from said data transfer element receiving said selected medium in response to absence of said identification number of said selected medium from said memory storage of said data transfer element receiving said selected medium.

15. The method of claim 13 further comprising:

clearing a previous list of allowed identification numbers for each of said data transfer elements in said partition.

16. The method of claim 13 wherein said reading step further comprises:

reading said identification number of said selected medium during transport of said selected medium from a medium storage slot to said data transfer element receiving said selected medium.

17. The method of claim 13 wherein said reading step further comprises:

reading said identification number of said selected medium using said data transfer element receiving said selected medium.

18. The method of claim 13 wherein said identification numbers are encoded in barcodes disposed on said media.

19. The method of claim 13 wherein said identification numbers reside in cartridge memory of said media.

20. The method of claim 13 wherein said unique identification numbers are universally unique.

21. A partitioned data library comprising:

data storage media, each medium of said media having an identification number;

a plurality of storage element slots each of said slots adapted to store a medium of said data storage media, at least one set of at least one of said slots assigned to one partition of a plurality of library partitions; and a plurality of data transfer elements that are adapted to receive said media and transfer data to and from said media, each of at least one set of at least one of said data transfer elements assigned to one of said library partitions, wherein access to said media by each of said data transfer elements is restricted to media having particular ones of said identification numbers, and wherein said medium is ejected from one of said data transfer element in response to said identification number not being one of said particular ones of said identification numbers.

22. The library of claim 21 further comprising a library controller directing movement of said media to and from one of said set of slots to and from one of said sets of data transfer elements assigned to a same of said partitions.

23. The library of claim 21 wherein each of said data transfer elements comprise memory storage storing a list of media identification numbers that data transfer element is allowed to access.

24. The library of claim 21 wherein said identification number is encoded in a barcode, disposed on said medium.

25. The library of claim 21 wherein said identification number resides in cartridge memory of said medium.

26. The library of claim 21 wherein said identification number of said medium is read during transport of said medium from one of said storage element slots to one of said data transfer elements.

27. The library of claim 21 wherein said media identification numbers are read by said data transfer elements.

28. The method of claim 21 wherein said unique identification numbers are universally unique.

\* \* \* \* \*